(12) United States Patent
Inoue et al.

(10) Patent No.: US 10,107,394 B2
(45) Date of Patent: Oct. 23, 2018

(54) CONTROL DEVICE FOR CONTINUOUSLY VARIABLE TRANSMISSION EQUIPPED WITH AUXILIARY TRANSMISSION

(71) Applicants: JATCO Ltd, Fuji-shi, Shizuoka (JP); NISSAN MOTOR CO., LTD., Yokohama-shi, Kanagawa (JP)

(72) Inventors: Mamiko Inoue, Ebina (JP); Takuichiro Inoue, Yamato (JP); Hiroyasu Tanaka, Atsugi (JP)

(73) Assignees: JATCO LTD, Fuji-shi (JP); NISSAN MOTOR CO., LTD., Yokohama-shi (JP)

( * ) Notice: Subject to any disclaimer, the term of this patent is extended or adjusted under 35 U.S.C. 154(b) by 256 days.

(21) Appl. No.: 15/021,439

(22) PCT Filed: Sep. 24, 2014

(86) PCT No.: PCT/JP2014/075171
§ 371 (c)(1),
(2) Date: Mar. 11, 2016

(87) PCT Pub. No.: WO2015/053072
PCT Pub. Date: Apr. 16, 2015

(65) Prior Publication Data
US 2016/0223080 A1 Aug. 4, 2016

(30) Foreign Application Priority Data
Oct. 8, 2013 (JP) .................................. 2013-210902

(51) Int. Cl.
*F16H 61/70* (2006.01)
*F16H 37/02* (2006.01)
(Continued)

(52) U.S. Cl.
CPC ........... *F16H 61/70* (2013.01); *F16H 37/021* (2013.01); *F16H 61/662* (2013.01);
(Continued)

(58) Field of Classification Search
None
See application file for complete search history.

(56) References Cited

U.S. PATENT DOCUMENTS

| | | | | |
|---|---|---|---|---|
| 4,458,558 | A * | 7/1984 | Frank | F16H 37/021 474/28 |
| 4,504,247 | A * | 3/1985 | Chana | F16H 63/062 474/17 |

(Continued)

FOREIGN PATENT DOCUMENTS

| | | |
|---|---|---|
| JP | S64-16444 A | 1/1989 |
| JP | H05-79554 A | 3/1993 |

(Continued)

OTHER PUBLICATIONS

U.S. Appl. No. 15/021,451, filed Mar. 11, 2016, Jatco Ltd.; Nissan Motor Co., Ltd.

*Primary Examiner* — William Kelleher
*Assistant Examiner* — Gregory T Prather
(74) *Attorney, Agent, or Firm* — Foley & Lardner LLP

(57) ABSTRACT

A control device for a continuously variable transmission with an auxiliary transmission includes: a cooperative control section; and a depression shift control section, wherein when an actual transmission gear ratio of the variator at the judgment of the depression shift control is higher than a first transmission gear ratio set as a lowest value of a control of the transmission gear ratio, the depression shift control section configured to downshift the variator, and to set a target transmission gear ratio at the shift of the variator to a
(Continued)

second transmission gear ratio which is a restriction value that is higher than the first transmission gear ratio.

3 Claims, 6 Drawing Sheets

(51) Int. Cl.
    *F16H 61/662*      (2006.01)
    *F16H 61/66*      (2006.01)
    *F16H 61/02*      (2006.01)

(52) U.S. Cl.
    CPC ............... *F16H 2037/023* (2013.01); *F16H 2061/0244* (2013.01); *F16H 2061/6614* (2013.01)

(56) References Cited

U.S. PATENT DOCUMENTS

| | | | |
|---|---|---|---|
| 5,024,638 A * | 6/1991 | Sakakibara | F16D 28/00 192/12 D |
| 5,080,639 A * | 1/1992 | Sakakibara | F16H 37/022 475/211 |
| 2004/0102267 A1* | 5/2004 | Murakami | F16H 7/08 474/69 |
| 2005/0202912 A1* | 9/2005 | Tay | F16H 63/062 474/83 |
| 2005/0277502 A1* | 12/2005 | Wood | F16H 9/20 474/19 |
| 2007/0117664 A1* | 5/2007 | Shioiri | F16H 55/56 474/28 |
| 2010/0075799 A1* | 3/2010 | Suzuki | F16H 61/0437 477/44 |
| 2010/0075801 A1* | 3/2010 | Suzuki | F16H 37/022 477/44 |
| 2010/0248886 A1* | 9/2010 | Jozaki | F16H 61/66259 475/210 |
| 2011/0015033 A1* | 1/2011 | Nonomura | F16H 61/66259 477/37 |
| 2011/0015839 A1* | 1/2011 | Takahashi | F16H 61/061 701/55 |
| 2012/0059559 A1* | 3/2012 | Tanaka | F16H 61/66259 701/52 |
| 2012/0059571 A1* | 3/2012 | Yamada | F16H 61/0031 701/112 |
| 2012/0060485 A1* | 3/2012 | Yamada | F16H 61/0025 60/436 |
| 2012/0060486 A1* | 3/2012 | Yamada | F16H 61/0025 60/459 |
| 2012/0083977 A1* | 4/2012 | Tanaka | F16H 61/66259 701/55 |
| 2014/0207348 A1* | 7/2014 | Wakayama | F02D 17/00 701/54 |
| 2014/0342876 A1* | 11/2014 | Tanaka | F16H 61/04 477/115 |
| 2015/0133257 A1* | 5/2015 | Uchino | F16H 37/022 475/210 |
| 2016/0102741 A1* | 4/2016 | Uchino | F16H 37/021 474/8 |
| 2016/0109000 A1* | 4/2016 | Uchino | F16H 37/022 474/8 |
| 2016/0290457 A1* | 10/2016 | Walter | F16H 37/022 |
| 2017/0211691 A1* | 7/2017 | Takahashi | F16H 61/12 |

FOREIGN PATENT DOCUMENTS

| | | |
|---|---|---|
| JP | H11-51162 A | 2/1999 |
| JP | 2009-193652 A | 8/2009 |
| JP | 2011-021716 A | 2/2011 |
| JP | 2013-033699 A | 2/2013 |

* cited by examiner

CONTROL DEVICE FOR CONTINUOUSLY VARIABLE TRANSMISSION EQUIPPED WITH AUXILIARY TRANSMISSION

TECHNICAL FIELD

This invention relates to a control device for a continuously variable transmission with an auxiliary transmission mechanism which is arranged to perform a non-cooperative shift in which the auxiliary transmission mechanism is shifted at high shift speed when a depression shift control with the shift of the auxiliary transmission mechanism is judged.

BACKGROUND ART

Conventionally, there has been known a control device for a continuously variable transmission with an auxiliary transmission which performs a cooperative control in which a variator and a stepped transmission mechanism are simultaneously shifted (cf. for example, a patent document 1). Moreover, there has been known a control device for a continuously variable transmission of a vehicle in which the cooperative control is not performed (stopped), and the 2→1 shift speed is set higher than that of the cooperative control for rapidly starting to increase the driving force, in a depression downshift control with a shift of the auxiliary transmission mechanism of the continuously variable transmission with the auxiliary transmission (cf. for example, patent document 2).

The "cooperative control" is a shift in (by) which the shift speed of the variator is increased so that the shift speed of the variator corresponds to the shift speed of the auxiliary transmission, and in which the transmission gear ratio of the variator is varied in a direction opposite to the variation direction of the transmission gear ratio of the auxiliary transmission, when the gear stage of the auxiliary transmission mechanism is varied. By performing the shift by this cooperative control, it is possible to suppress the sudden variation of the transmission gear ratio of the entire transmission (hereinafter, referred to as "through transmission gear ratio"), to decrease the shift shock before and after the shift by the auxiliary transmission, and thereby to suppress the unnatural feeling to the driver.

However, in the conventional device, at the depression downshift control with the shift of the auxiliary transmission, the downshift (2nd speed→1st speed) of the auxiliary transmission is performed at a speed higher than that of the cooperative control. In a case where the transmission gear ratio of the variator is higher than the lowest transmission gear ratio, the variator is once downshifted from the high side to the lowest side. The variator is upshifted from the lowest side to the high side in accordance with the shift of the desired target through transmission gear ratio.

In this way, when the variator is downshifted from the high side to the lowest side, the transmission gear ratio of the variator is shifted and overshot to the side lower than the control lowest transmission gear ratio which is set for the control. Accordingly, when the variator is started to be upshifted from the lowest side in accordance with the shift of the desired target through transmission gear ratio, "Low separation shock" is generated, so that the unnatural feeling is provided to the driver.

It is, therefore, an object of the present invention to provide a control device for a continuously variable transmission with an auxiliary transmission which is devised to solve the above-described problems, to suppress the Low separation shock generated in the variator at the depression shift control with the shift of the auxiliary transmission mechanism, and to improve the drivability.

PRIOR ART DOCUMENT

Patent Document

Patent Document 1: Japanese Patent Application No. H5-79554
Patent Document 2: Japanese Patent Application No. 2011-021716

SUMMARY OF THE INVENTION

For attaining the above-described object, in the present invention, a control device for a continuously variable transmission with an auxiliary transmission which is mounted to a vehicle, and which includes a variator arranged to continuously vary a transmission gear ratio, and an auxiliary transmission mechanism that is disposed in series with the variator, and that has a first shift stage being a forward shift stage, and a second shift stage being the forward shift stage, and having a transmission gear ratio smaller than a transmission gear ratio of the first shift stage, the control device comprises:

a cooperative control means configured to perform a cooperative control to shift the auxiliary transmission mechanism, and to shift the variator in a direction opposite to a shift direction of the auxiliary transmission mechanism when the shift stage of the auxiliary transmission mechanism is varied; and a depression shift control means configured to perform a non-cooperative control to shift the auxiliary transmission mechanism at a shift speed faster than a shift speed at the cooperative control when an accelerator pedal is depressed at a degree that is equal to or greater than a predetermined value, and a depression shift control with the shift of the auxiliary transmission mechanism is judged, wherein when an actual transmission gear ratio of the variator at the judgment of the depression shift control is higher than a first transmission gear ratio set as an upper limit value for a control of a transmission gear ratio, the depression shift control means configured to set a target transmission gear ratio at the shift of the variator to a second transmission gear ratio which is a restriction value that is higher than the first transmission gear ratio.

Accordingly, in a case where the actual transmission gear ratio of the variator at the judgment (determination) of the depression shift control is higher than the first transmission gear ratio that is set as the upper limit value for the control of the transmission gear ratio, the target transmission gear ratio of the variator at the shift of the variator is set to the second transmission gear ratio which is a restriction value that is higher than the first transmission gear ratio.

That is, the first transmission gear ratio for the transmission gear ratio control is set to the higher side than the upper limit transmission gear ratio of the mechanism of the variator. In the depression shift control by the non-cooperative control, for making the actual through transmission gear ratio follow the desired target through transmission gear ratio, the shift speed of the variator which is slower than the auxiliary transmission mechanism is increased, with respect to the auxiliary transmission mechanism which has the shift speed higher than that of the cooperative control. Accordingly, when the variator is started to be downshifted so that the first transmission gear ratio is set to the target transmission gear ratio, the actual transmission gear ratio is overshot toward the upper limit transmission gear ratio on the mechanism.

On the other hand, in a case where the target transmission gear ratio is previously set to the second transmission gear ratio which is the restriction value that is higher than the first transmission gear ratio in consideration of the overshoot amount when the shift of the variator is started, the deviation between the actual transmission gear ratio and the target transmission gear ratio which determines a controlled variable at the shift becomes small. Accordingly, even when the shift speed is increased, it is possible to suppress the overshoot of the actual transmission gear ratio. Therefore, it is possible to suppress the Low separation shock which is generated in the variator at the depression shift control with the shift of the auxiliary transmission, and to improve the drivability.

DESCRIPTION OF EMBODIMENTS

Hereinafter, a structure is explained. A preferred embodiment to attain a control device of a continuously variable transmission with an auxiliary transmission according to the present invention is explained based on an embodiment shown in a first embodiment.

First Embodiment

First, the structure is explained.

The structure of the control device of the continuously variable transmission with the auxiliary transmission according to the first embodiment is explained as to "Overall System Configuration", "Shift Control Configuration by Shift Map", "Cooperative Control Configuration of Auxiliary Transmission Mechanism and Variator", and "Depression Downshift Non-cooperative Control Configuration".

[Overall System Configuration]

Figure 1:
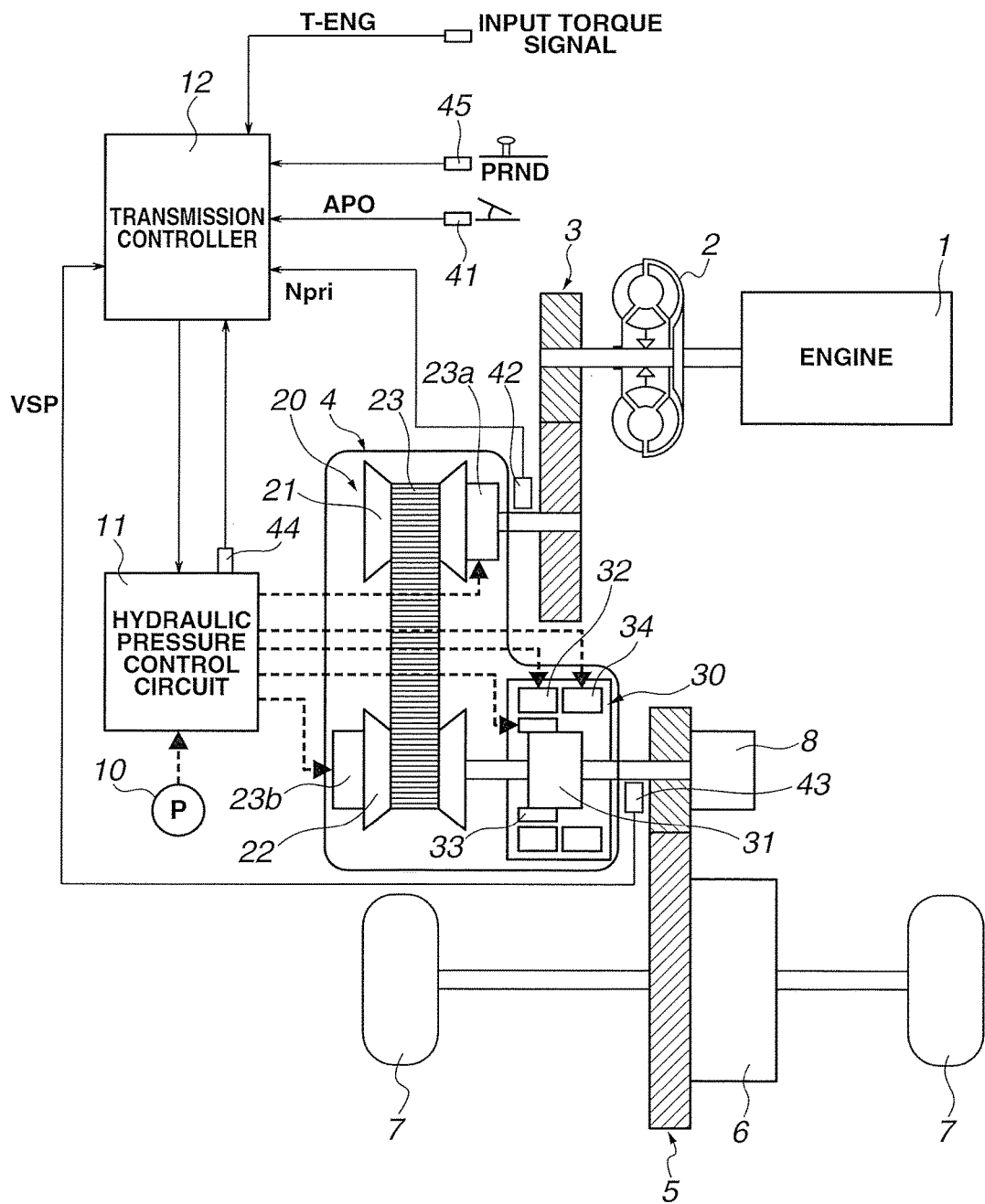
FIG. 1 is an overall view showing a schematic configuration of a vehicle mounted with a continuously variable transmission with an auxiliary transmission to which a control device according to a first embodiment is applied.
Figure 2:
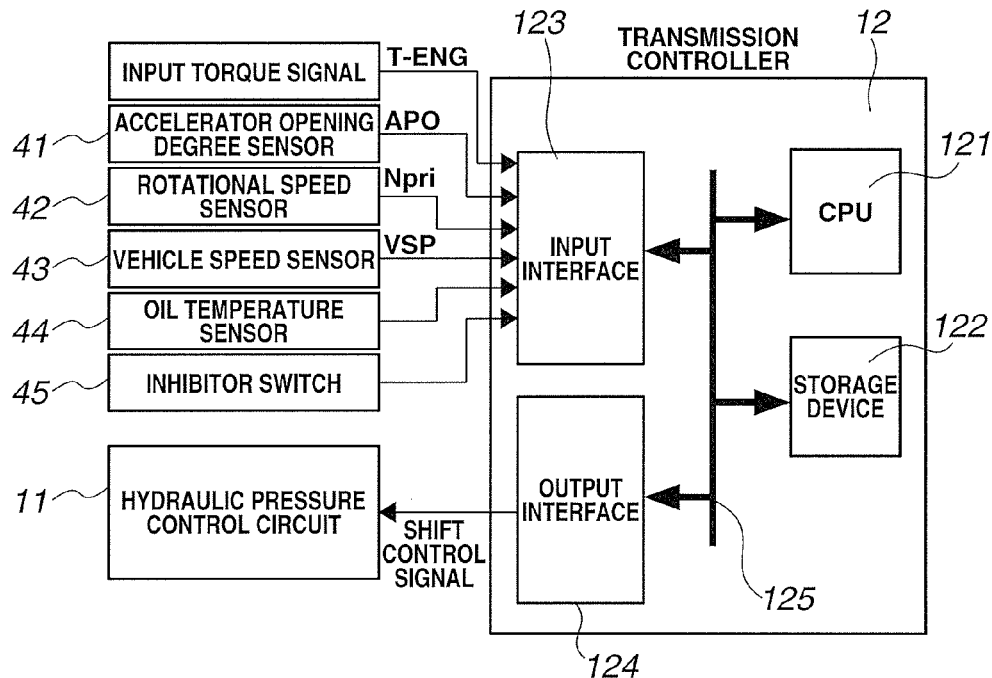
FIG. 2 is a block diagram showing an internal structure of a transmission controller of the first embodiment.

FIG. 1 is an overall view showing a schematic configuration of a vehicle mounted with a continuously variable transmission with an auxiliary transmission to which a control device according to a first embodiment is applied. FIG. 2 is a block diagram showing an internal structure of a transmission controller of the first embodiment. In below illustrations, a "transmission gear ratio" of a transmission mechanism is a value obtained by dividing an input rotational speed of the transmission mechanism by an output rotational speed of the transmission mechanism. Moreover, a "lowest transmission gear ratio" means a maximum transmission gear ratio of the transmission mechanism. A "highest transmission gear ratio" means a minimum transmission gear ratio of the transmission mechanism.

The vehicle mounted with the continuously variable transmission with the auxiliary transmission includes an engine 1 serving as a power source. An output rotation of engine 1 is transmitted to driving wheels 7 through a torque converter 2 with a lockup clutch, a first gear train 3, a continuously variable transmission (hereinafter, referred to simply as a transmission 4), a second gear train 5, and a final reduction gear 6. The vehicle further includes a parking mechanism 8 provided to the second gear train 5, and arranged to mechanically lock an output shaft of transmission 4 during parking so that the output shaft of transmission 4 cannot rotate.

Moreover, the vehicle includes an oil pump 10 arranged to be driven by using a part of the power of engine 1; a hydraulic pressure control circuit 11 arranged to regulate a hydraulic pressure from oil pump 10, and to supply the regulated hydraulic pressure to various parts of transmission 4; and a transmission controller 12 configured to control hydraulic pressure control circuit 11. Hereinafter, respective configurations are explained.

Transmission 4 includes a continuously variable transmission mechanism (hereinafter, referred to as a variator 20), and an auxiliary transmission mechanism 30 disposed in series with variator 20. Here, "in series with" represents that auxiliary transmission mechanism 30 is disposed in series with variator 20 in an identical power transmitting path. Auxiliary transmission mechanism 30 may be connected directly with the output shaft of variator 20, like this embodiment. Alternatively, auxiliary transmission mechanism 30 may be connected with the output shaft of variator 20 through other transmission mechanism or other power transmitting mechanism (for example, gear train).

Variator 20 is a belt type continuously variable transmission mechanism including a primary pulley 21, a secondary pulley 22, a V belt 23 wound around primary pulley 21 and secondary pulley 22. Each of primary and secondary pulleys 21 and 22 includes a fixed conical disc; a movable conical disc disposed relative to the fixed conical disc so that respective sheave surfaces thereof confront each other so as to form a V groove between the fixed conical disc and the movable conical disc; and one of hydraulic cylinders 23a and 23b each of which is disposed behind one of the movable conical discs, and which is arranged to move the movable conical disc in an axial direction. By adjusting the hydraulic pressures supplied to hydraulic cylinders 23a and 23b, a width of the V groove is varied, so that contact radii between V belt 23 and pulleys 21, 22 are varied. Consequently, a transmission gear ratio vRatio of variator 20 is continuously varied.

Auxiliary transmission mechanism 30 is a transmission mechanism having two forward shift stages and one reverse shift stage. Auxiliary transmission mechanism 30 includes a Ravigneaux type planetary gear mechanism 31 in which careers of two planetary gears are connected; and a plurality of frictional engagement elements (a Low brake 32, a High clutch 33, and a Rev (Reverse) brake 34) connected with a plurality of rotational elements constituting Ravigneaux type planetary gear mechanism 31, and arranged to vary connection states with the rotational elements. A shift stage of auxiliary transmission mechanism 30 is varied by varying engagement/disengagement states of frictional engagement elements 32-34 by regulating the hydraulic pressures supplied to frictional engagement elements 32-34. For example, the shift stage of auxiliary transmission mechanism 30 becomes a first speed by engaging Low brake 32, and by disengaging High clutch 33 and Rev brake 34. The shift stage of auxiliary transmission mechanism 30 becomes a second speed which has a transmission gear ratio smaller than that of the first speed, by engaging High clutch 33, and by disengaging Low brake 32 and Rev brake 34. Moreover, the shift stage of auxiliary transmission mechanism 30 becomes a reverse speed by engaging Rev brake 34, and by disengaging Low brake 32 and High clutch 33. Hereinafter, when the shift stage of auxiliary transmission mechanism 30 is the first speed, it is represented by "transmission 4 is a low speed mode". When the shift stage of auxiliary transmission mechanism 30 is the second speed, it is represented by "transmission 4 is a high speed mode".

As shown in FIG. 2, transmission controller 12 includes a CPU 121, a storage device 122 including a RAM and a ROM, an input interface 123, an output interface 124, and a bus 125 connecting these components to each other.

Input interface 123 receives an output signal of an accelerator opening sensor 41 arranged to sense a depression opening degree of an accelerator pedal (hereinafter, referred to as an accelerator opening APO), an output signal of a rotational speed sensor 42 arranged to sense an input rotational speed of transmission 4 (=a rotational speed of primary pulley 21, hereinafter, referred to as a primary rotational speed Npri), an output signal of a vehicle speed sensor 43 arranged to sense a running speed of the vehicle (hereinafter, referred to as a vehicle speed VSP), an output signal of an oil temperature sensor 44 arranged to sense an oil temperature of transmission 4, an output signal of an inhibitor switch 45 arranged to sense a position of a select lever, and a torque signal T-ENG which is an output torque signal of the engine 1.

Storage device 122 stores a shift control program of transmission 4, and a shift map (FIG. 3) used by this shift control program. CPU 121 reads the shift control program stored in storage device 122. CPU 121 carries out this shift control program to perform various calculations of the various signals inputted through input interface 123, and generates a shift control signal. CPU 121 outputs this shift control signal through output interface 124 to hydraulic pressure control circuit 11. The various values used by the calculation of CPU 121 and the results of the calculation of CPU 121 are stored in storage device 122.

Hydraulic pressure control circuit 11 includes a plurality of fluid passages and a plurality of hydraulic pressure control valves. Hydraulic pressure control circuit 11 is configured to control the plurality of the hydraulic pressure control valves based on the shift control signal from transmission controller 12, and thereby to switch supply passages of the hydraulic pressure. Moreover, hydraulic pressure control circuit 11 is configured to adjust a necessary hydraulic pressure from the hydraulic pressure generated in oil pump 10, and to supply this necessary hydraulic pressure to the various parts of the transmission 4. With this, the transmission gear ratio vRatio of variator 20 and the shift stage of auxiliary transmission mechanism 30 are varied, and the shift of transmission 4 is performed.

[Shift Control Configuration by Shift Map]

Figure 3:
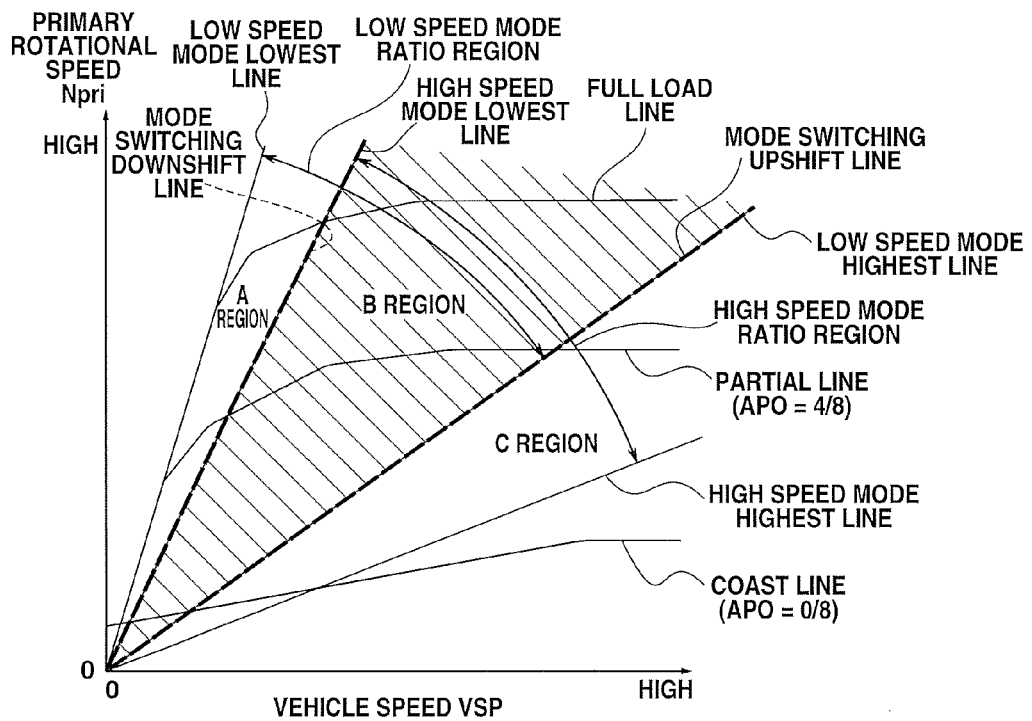
FIG. 3 is a shift map diagram showing one example of a shift map stored in a storage device of the transmission controller of the first embodiment.

FIG. 3 shows one example of the shift map stored in storage device 122 of transmission controller 12. Hereinafter, a shift control configuration is explained by a shift map is explained.

In this shift map, an operating point of transmission 4 is determined based on vehicle speed VSP and primary rotational speed Npri in the shift map shown in FIG. 3. An inclination of a line connecting the operating point of transmission 4 and a zero point of the shift map at a left lower corner represents the transmission gear ratio of transmission 4 (overall transmission gear ratio obtained by multiplying transmission gear ratio vRatio of variator 20 by transmission gear ratio subRatio of auxiliary transmission mechanism 30, hereinafter, referred to as a through transmission gear ratio Ratio). In this shift map, a shift line is set at each of accelerator openings APO, like the conventional belt type continuously variable transmission. The shift of transmission 4 is performed in accordance with the shift line selected in accordance with accelerator opening APO. For the sake of simplicity, FIG. 3 shows a full load line (a shift line at accelerator opening APO=8/8), a partial line (a shift line at accelerator opening APO=4/8), and a coast line (a shift line at accelerator opening APO=0) only.

When transmission 4 is in the low speed mode, transmission 4 can be shifted between a low speed mode lowest line obtained by maximizing transmission gear ratio vRatio of variator 20, and a low speed mode highest line obtained by minimizing transmission gear ratio vRatio of variator 20. In this case, the operating point of transmission 4 is moved within an A region and a B region. On the other hand, when transmission 4 is in the high speed mode, transmission 4 can be shifted between a high speed mode lowest line obtained by maximizing transmission gear ratio vRatio of variator 20, and a high speed mode highest line obtained by minimizing transmission gear ratio vRatio of variator 20. In this case, the operating point of transmission 4 is moved within the B region and a C region.

The transmission gear ratio of each of the shift stages of auxiliary transmission mechanism 30 is set so that the transmission gear ratio corresponding to the low speed mode highest line (a low speed mode highest transmission gear ratio) becomes smaller than the transmission gear ratio corresponding to the high speed mode lowest line (a high speed mode lowest transmission gear ratio). With this, a low speed mode ratio region which is a region of through transmission gear ratio Ratio of transmission 4 that can be attained in the low speed mode, and a high speed mode ratio region which is a region of is through transmission gear ratio Ratio of transmission 4 that can be attained in the high speed mode are partially overlapped with each other. When the operating point of transmission 4 is in the B region which is sandwiched by the high speed mode lowest line and the low speed mode highest line, transmission 4 can select either the low speed mode or the high speed mode.

Transmission controller 12 sets, as a desired through transmission gear ratio DRatio, the through transmission gear ratio corresponding to vehicle speed VSP and accelerator opening APO (a driving state of the vehicle), with reference to this shift map. This desired through transmission gear ratio DRatio is a target value that through transmission gear ratio Ratio should finally attain in this driving state. Moreover, transmission controller 12 sets a target through transmission gear ratio tRatio which is a transient target value that through transmission gear ratio Ratio follows the desired through transmission gear ratio DRatio by a desired response characteristic. Transmission controller 12 controls variator 20 and auxiliary transmission mechanism 30 so that through transmission gear ratio Ratio corresponds to target through transmission gear ratio tRatio.

In this shift map, a mode switching upshift line for performing the upshift of auxiliary transmission mechanism 30 (a 1→2 shift line of auxiliary transmission mechanism 30) is set to be substantially overlapped with the low speed mode highest line. The through transmission gear ratio corresponding to the mode switching upshift line is substantially equal to a low speed mode highest transmission gear ratio. Moreover, in the shift map, a mode switching downshift line for performing the downshift of auxiliary transmission mechanism 30 (a 2→1 shift line of auxiliary transmission mechanism 30) is set to be substantially overlapped with the high speed mode lowest line. The through transmission gear ratio corresponding to the mode switching downshift line is substantially equal to a high speed mode lowest transmission gear ratio.

When the operating point of transmission 4 crosses the mode switching upshift line or the mode switching downshift line, that is, when the target through transmission gear ratio Ratio of the transmission 4 is varied to be across mode switching transmission gear ratio mRatio, or when the target through transmission gear ratio Ratio corresponds to the mode switching transmission gear ratio mRatio, transmission controller 12 performs the mode switching shift control. In this mode switching shift control, transmission controller 12 performs the shift of auxiliary transmission mechanism 30, and performs a coordinative shift (cooperative shift) to cooperate the two shift operations to vary transmission gear ratio vRatio of variator 20 in a direction opposite to a direction in which transmission gear ratio subRatio of auxiliary transmission mechanism 30 is varied.

In this coordinative control, when target through transmission gear ratio Ratio of transmission 4 is moved across the mode switching upshift line or corresponds to the mode switching upshift line, transmission controller 12 outputs the 1→2 upshift judgment, and changes the shift stage of auxiliary transmission mechanism 30 from the first speed to the second speed. At the same time, transmission controller 12 varies the transmission gear ratio vRatio of variator 20 from the highest transmission gear ratio to the lowest transmission gear ratio. Conversely, when through transmission gear ratio tRatio of transmission 4 is moved across the mode switching downshift line or corresponds to the mode switching downshift line, transmission controller 12 outputs the 2→1 downshift judgement, and changes the shift stage of auxiliary transmission mechanism 30 from the second speed to the first speed. At the same time, transmission controller 12 varies the transmission gear ratio vRatio of variator 20 from the lowest transmission gear ratio to the highest transmission gear ratio.

The coordinative shift to vary the transmission gear ratio vRatio of the variator 20 is performed at the mode switching upshift or the mode switching downshift for suppressing the unnatural feeling of the driver by the variation of the input rotation which is caused by unevenness of through transmission gear ratio Ratio of transmission 4. Moreover, it is possible to ease the shift shock of auxiliary transmission mechanism 30 by shifting auxiliary transmission mechanism 30 in this state.

[Cooperative Control Configuration of Auxiliary Transmission Mechanism and Variator]

Figure 4:
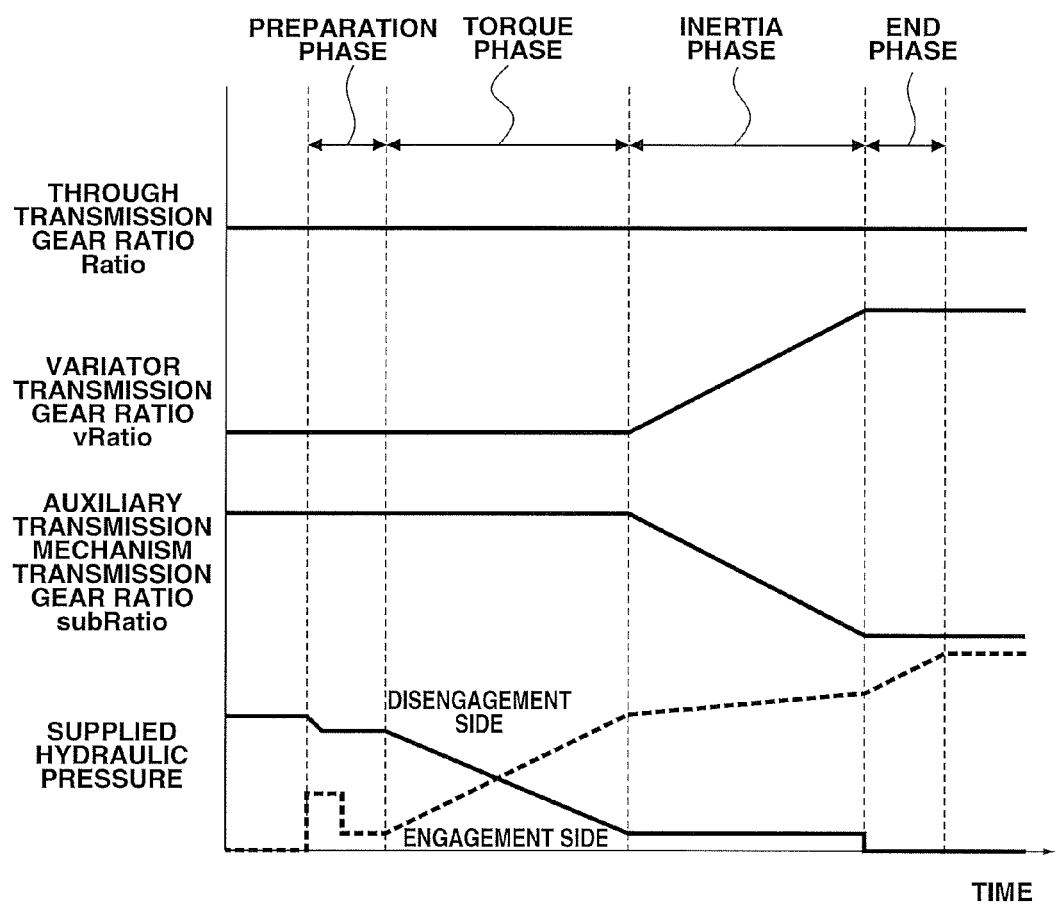
FIG. 4 is a time chart for illustrating a cooperative control which is performed in the transmission controller of the first embodiment, and by which the through transmission gear ratio is maintained constant.

FIG. 4 is a time chart showing the cooperative control operation. The cooperative shift of the auxiliary transmission mechanism 30 is constituted by four phases of a preparation phase, a torque phase, an inertia phase, and an end phase.

In the preparation phase, the hydraulic pressure is previously charged to the engagement side frictional engagement elements. The preparation phase is a phase in which the engagement side frictional engagement element is standby in a state just before the engagement. The engagement side frictional engagement element is the frictional engagement element engaged with the shift stage after the shift. The engagement side frictional engagement element is the High clutch 33 at the 1→2 upshift. The engagement side frictional engagement element is the Low brake 32 at the 2→1 downshift.

The torque phase is a phase in which the hydraulic pressure supplied to the disengagement side frictional engagement element is decreased, and in which the shift stage arranged to transmit the torque is shifted from the shift stage of the disengagement side frictional engagement element to the shift stage of the engagement side frictional engagement element. The disengagement side frictional engagement element is the Low brake 32 at the 1→2 upshift. The disengagement side frictional engagement element is the High clutch 33 at the 2→1 downshift.

The inertia phase is a phase in which the transmission gear ratio subRatio of the auxiliary transmission mechanism 30 is varied from the transmission gear ratio of the shift stage before the shift, to the transmission gear ratio after the shift. The transmission controller 12 in the inertia phase generates the target transmission gear ratio of the auxiliary transmission mechanism 30 to smoothly shift from the transmission gear ratio of the shift stage before the shift of the auxiliary transmission 30 to the transmission gear ratio of the shift stage after the shift, and to shift at a shift speed that is substantially identical to the shift speed of the variator 20. The transmission controller 12 calculates the target transmission gear ratio tvRatio of the variator 20 by dividing the target through transmission gear ratio tRatio by the target transmission gear ratio tsubRatio of auxiliary transmission mechanism 30. Then, the transmission controller 12 controls the variator 20 so that the transmission gear ratio vRatio of the variator 20 corresponds to the target transmission gear ratio tvRatio. The transmission controller 12 performs the feedback control of the hydraulic pressure supplied to the Low brake 32 and the High clutch 33 so that the transmission gear ratio subRatio of the auxiliary transmission mechanism 30 corresponds to the target transmission gear ratio tsubRatio. With this, the target through transmission gear ratio tRatio is attained, and the transmission gear ratios of the variator 20 and the auxiliary transmission mechanism 30 are controlled in the opposite directions.

The end phase is a phase in which the hydraulic pressure supplied to the disengagement side frictional engagement element is zero to fully disengage the disengagement side frictional engagement element, and in which the hydraulic pressure supplied to the engagement side frictional engagement element is increased to fully engage the engagement side frictional engagement element.

These four phases are generated in the order opposite to the above-order at the upshift (automatic upshift) which is caused by increasing the vehicle speed by depressing the accelerator pedal by the driver, and at the downshift (the coast downshift) which is caused by decreasing the vehicle speed while the driver releases the foot from the accelerator pedal. However, the order of the torque phase and the inertia phase becomes opposite at the upshift (foot-release upshift) which is caused when the driver releases the foot from the accelerator pedal, and at the downshift (the depression downshift including the kick-down shift) which is caused when the drive depresses the accelerator pedal.

The through transmission gear ratio is not varied before and after the cooperative shift in FIG. 4. This is because the target through transmission gear ratio tRatio before and after the cooperative shift is maintained constant. The cooperative control in this specification is not limited to this embodiment. The cooperative control is an overall control operation configured to vary the transmission gear ratio of the variator 20 in a direction opposite to the variation direction of the transmission gear ratio of the auxiliary transmission 30, and thereby to control the through transmission gear ratio Ratio to the target transmission gear ratio Ratio (the cooperative control means).

[Depression Downshift Non-Cooperative Control Configuration]

Figure 5:
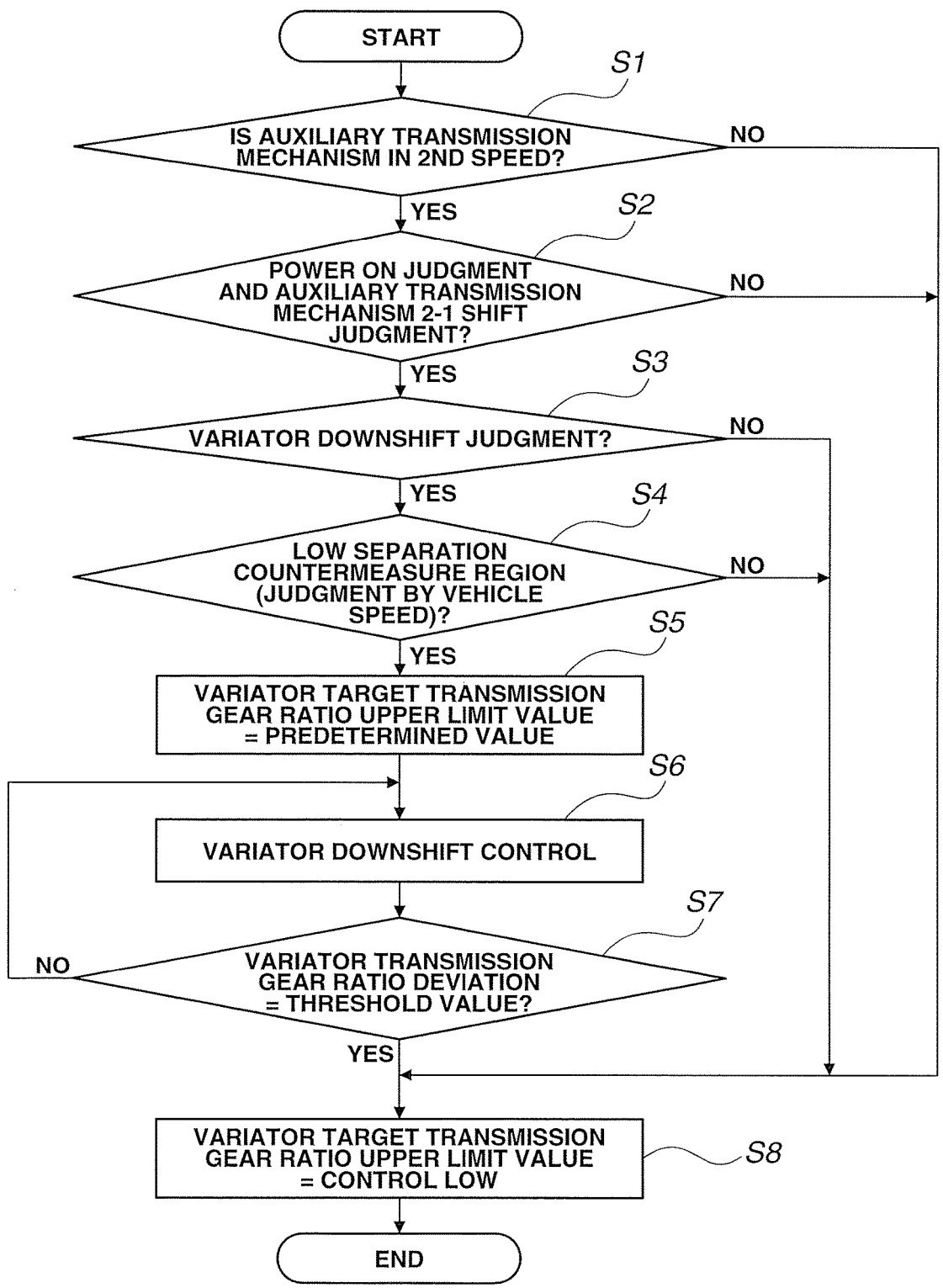
FIG. 5 is a flowchart showing a flow of a depression downshift non-cooperative control operation which is performed in the transmission controller of the first embodiment.

FIG. 5 shows a flow of a depression downshift non-cooperative control operation which is performed in the transmission controller 12 of the first embodiment (the depression shift control means). Hereinafter, steps of FIG. 5 which represent the depression downshift non-cooperative control operation configuration are explained.

At step S1, it is judged whether or not the auxiliary transmission mechanism is in the second speed. When the answer of step S1 is Yes (the auxiliary transmission mechanism is in the second speed), the process proceeds to step S2. When the answer of step S1 is No (the auxiliary transmission mechanism is in the first speed), the process proceeds to step S8.

Subsequently to the judgment (determination) that the auxiliary transmission mechanism 30 is in the second speed at step S1, at step S2, it is judged whether or not it is the power ON judgment and it is the 2→1 downshift judgment in the auxiliary transmission mechanism 30. When the answer of step S2 is Yes (the power ON and the 2→1 downshift judgment), the process proceeds to step S3. When the answer of step S2 is No (the power OFF or the second speed judgment), the process proceeds to step S8.

In this case, the power ON is judged when the input torque signal T-ENG inputted from the engine side to the transmission controller 12 satisfies T-ENG>a predetermined value, or when the accelerator opening degree APO satisfies APO>0. The 2→1 downshift is judged when the operating point determined by the vehicle speed VSP, the accelerator opening degree APO, and the primary rotational speed Npri passes across the mode switching downshift line in the shift map shown in FIG. 3, or corresponds the mode switching downshift line.

Subsequently to the judgments of the Power ON and the 2→1 downshift at step S2, at step S3, it is judged whether or not the judgement of the downshift of the variator 20 is satisfied. When the answer of step S3 is Yes (the judgment of the variator downshift is satisfied), the process proceeds to step S4. When the answer of step S3 is No (the judgment of the variator downshift is not satisfied), the process proceeds to step S8.

In this case, the judgment of the downshift of the variator 20 is satisfied when the actual transmission gear ratio of the variator 20 at the judgment of the depression downshift is higher than a control lowest transmission gear ratio which is set as an upper limit value for the transmission gear ratio control. On the other hand, the judgment of the downshift of the variator 20 is not satisfied when the actual transmission gear ratio of the variator 20 at the judgment of the depression downshift is equal to or lower than the control lowest transmission gear ratio, and the downshift of the variator 20 is not needed.

Subsequently to the judgement that the judgment of the variator downshift is satisfied at step S3, at step S4, it is judged whether or not the vehicle condition is in a Low separation countermeasure region (judged by the vehicle speed VSP). When the answer of step S4 is Yes (the vehicle condition is in the Low separation countermeasure region), the process proceeds to step S5. When the answer of step S4 is No (the vehicle condition is not in the Low separation countermeasure region), the process proceeds to step S8.

In this case, it is judged that the vehicle condition is in the Low separation countermeasure region in a case where the vehicle condition is in a region in which the actual transmission gear ratio is supposed to be overshot toward the mechanical lowest transmission gear ratio with respect to the target transmission gear ratio when the downshift of the variator 20 is performed (a region in which it is supposed that a state in which the actual transmission gear ratio does not correspond to the target transmission gear ratio continues during a predetermined time period). In particular, it is performed by the judgment of the vehicle speed. The Low separation countermeasure region is a region in which the vehicle speed is equal to or greater than a threshold value and the downshift speed of the variator 20 becomes high.

Subsequently to the judgment that the vehicle condition is in the Low separation countermeasure region at step S4, at step S5, the variator target transmission gear ratio upper limit value (second transmission gear ratio) is set to a predetermined value (upper limit restriction value) which is higher than the control lowest transmission gear ratio. The process proceeds to step S6.

In this case, the variator target transmission gear ratio upper limit value is a target transmission gear ratio which is a final target when the variator is downshifted toward the lowest side, before the upshift by the variator 20.

Subsequently to the variator target transmission gear ratio upper limit value=the predetermined value at step S5, or the judgment of the variator transmission gear ratio deviation>the threshold value at step S7, at step S6, the final target transmission gear ratio when the downshift of the variator 20 is performed is set to the predetermined value (the second transmission gear ratio) which is higher than the control lowest transmission gear ratio (the first transmission gear ratio) at step S5. The shift speed is increased. The downshift control is performed. The process proceeds to step S7.

Subsequently to the variator downshift control at step S6, at step S7, a variator transmission gear ratio deviation which is a difference between the target transmission gear ratio and the control transmission gear ratio (the actual transmission gear ratio under the calculation (the operated actual transmission gear ratio)) of the variator is calculated. It is judged whether or not the calculated variator transmission gear ratio deviation becomes equal to or smaller than the threshold value. When the answer of step S7 is Yes (the variator transmission gear ratio deviation≤the threshold value), the process proceeds to step S8. When the answer of step S7 is No (the variator transmission gear ratio deviation>the threshold value), the process returns to step S6.

In this case, the threshold value of the variator transmission gear ratio deviation is set to a convergence judgment value for judging that the control transmission gear ratio is converged from a state in which the control transmission gear ratio is deviated from the target transmission gear ratio of the variator 20.

Subsequently to the judgment that the auxiliary transmission mechanism is in the first speed at step S1, the judgment that the operation is other than the depression downshift at step S2, the judgment that the judgment of the variator downshift is not satisfied at step S3, the judgment that it is other than the Low separation countermeasure region at step S4, or the judgement of the variator transmission gear ratio deviation≤the threshold value at step S7, at step S8, the variator target transmission gear ratio upper limit value is set to the control lowest transmission gear ratio which is previously set (the control Low: the first transmission gear ratio). The process proceeds to the end.

In this case, the variator target transmission gear ratio upper limit value is usually set to the previously set control lowest transmission gear ratio (the control Low). However, when the variator target transmission gear ratio upper limit value is varied to the predetermined value (the second transmission gear ratio), the variation to the predetermined value (the second transmission gear ratio) is canceled. At step S8, the variator target transmission gear ratio returns from the predetermined value (the second transmission gear ratio) to the control lowest transmission gear ratio (the control Low: the first transmission gear ratio).

Next, operations are illustrated.

The operations of the control device of the continuously variable transmission with the auxiliary transmission according to the first embodiment is explained as to [Problems of Comparative Example] and [Depression Downshift Non-cooperative Control Operation].

Problems of Comparative Example

First, preconditions are explained. In the continuously variable transmission with the auxiliary transmission, when the depression downshift control judgement with the shift of the auxiliary transmission mechanism is performed, the cooperative control of the auxiliary transmission mechanism and the variator is not performed (stopped). The non-cooperative control is performed.

In particular, the through transmission gear ratio is rapidly varied toward the large side of the transmission gear ratio for rapidly starting to increase the driving force. Accordingly, the speed of the 2→1 downshift of the auxiliary transmission mechanism is increased than the speed at the cooperative control. The variator is shifted to follow the desired target through transmission gear ratio.

In the continuously variable transmission with the auxiliary transmission in which the cooperative control is not performed and the non-cooperative control is performed at the depression downshift judgment with the shift of the auxiliary transmission, the comparative example is a configuration in which the control lowest transmission gear ratio that is used in the transmission gear ratio control of the variator, and that is set as the transmission gear ratio upper limit value is set to a fixed value that is higher than the mechanical lowest transmission gear ratio determined by the mechanism of the variator. The operation of the depression downshift control with the shift of the auxiliary in this comparative example is explained based on the time chart of FIG. 6.

In the vehicle mounted with the continuously variable transmission having the auxiliary transmission, when the accelerator is depressed at time t1 from traveling of the low vehicle speed and the low opening degree, the depression downshift with the shift of the auxiliary transmission mechanism is judged at time t2. In a case where the actual transmission gear ratio of the variator is higher than the control lowest transmission gear ratio at this judgment of the depression downshift, the variator is once downshifted from the high side to the lowest side, and the auxiliary transmission mechanism is downshifted (2nd speed→1st speed) (time t2 to time t3 of FIG. 6). Then, after time t3, the variator is shifted from the lowest side to the highest side to follow the desired target through transmission gear ratio.

In this way, when the variator is once downshifted to the lowest side, the target transmission gear ratio is set to the control lowest transmission gear ratio. For attaining the shift response, the shift speed of the variator is increased relative to the shift speed of the variator at the normal shift control so that the transmission gear ratio of the variator is early varied to the lowest side. (E portion of FIG. 6).

Figure 6:
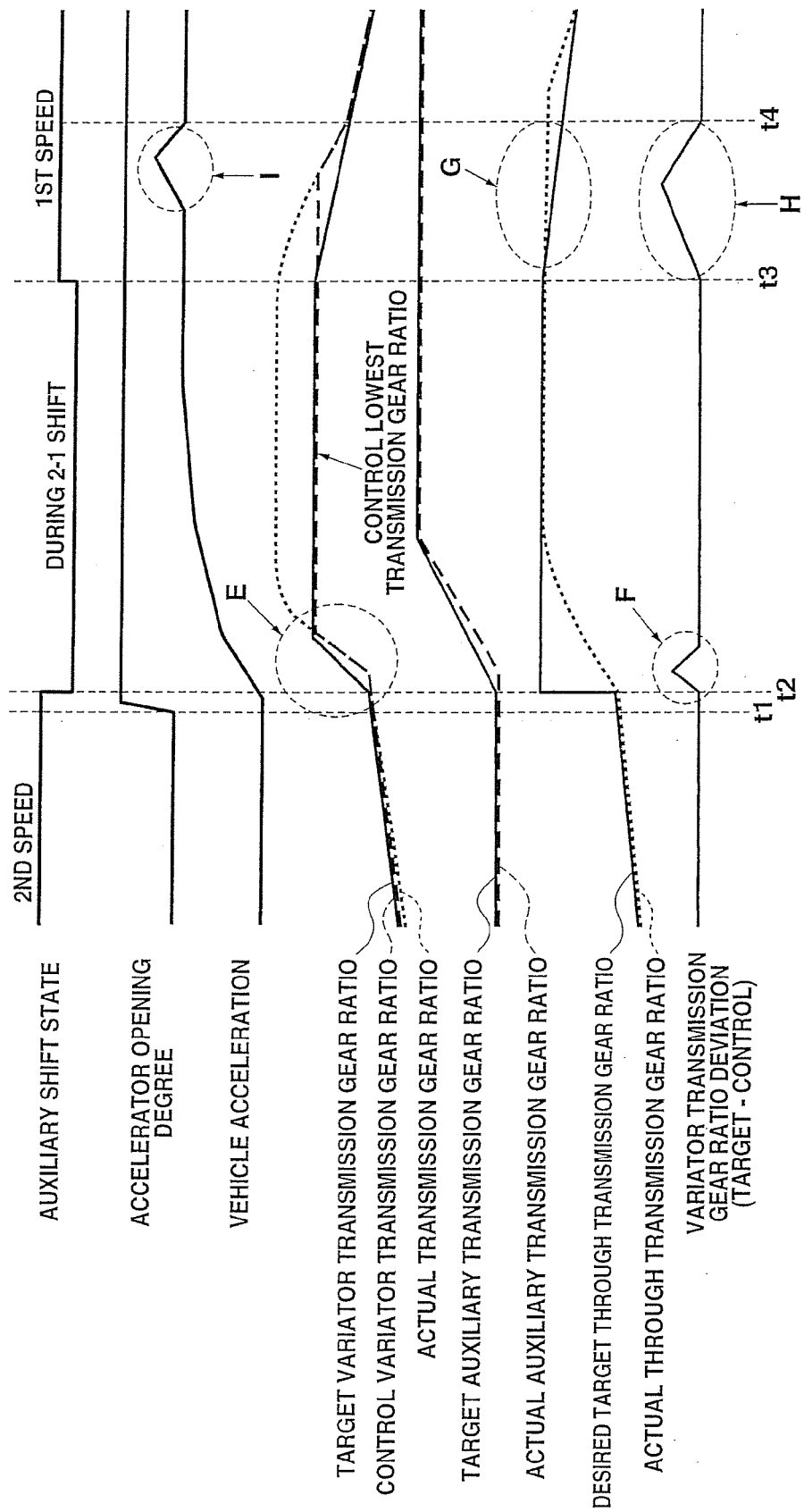
FIG. 6 is a time chart showing characteristics of an auxiliary shift state, an accelerator opening degree, a vehicle acceleration, an actual variator transmission gear ratio, a target variator transmission gear ratio, a control variator transmission gear ratio, a target auxiliary transmission gear ratio, an actual auxiliary transmission gear ratio, a desired target transmission gear ratio, an actual through transmission gear ratio, and a variator transmission gear ratio deviation, which represent a 2→1 depression downshift non-cooperative control that is performed in a transmission controller of a comparative example.

In this case the actual transmission gear ratio (the input rotation/the output rotation) of the variator is shifted and overshot beyond the lower side transmission gear ratio (the control lowest transmission gear ratio) which is set for the control, to the lower side lower than the lower side transmission gear ratio (the actual variator transmission gear ratio characteristics shown by a dot line of FIG. 6). In this case, the control lowest transmission gear ratio is set. This is for preventing the actual transmission gear ratio from excessively moving to the low side for improving the controllability and the robust characteristics of the variator. However, in a state where the variator is once downshifted to the lowest side, the actual transmission gear ratio of the variator is overshot beyond the control lowest transmission gear ratio (=target transmission gear ratio) due to the increase of the shift speed. In this case, the actual transmission gear ratio (the input rotation/the output rotation) of the variator is overshot beyond the target transmission gear ratio. However, the actual transmission gear ratio under the calculation is processed as the control low transmission gear ratio. Accordingly, in the variator downshift region (F portion in FIG. 6) immediately after the time t2 during a time period from time t2 to time t3 of FIG. 6, the variator transmission gear ratio deviation (target-control) is generated. However, after that, the variator transmission gear ratio deviation (target-control) is maintained to zero.

When the target transmission gear ratio of the variator is started to be upshifted from the lowest side to the high side at time t3 so as to follow the desired target through transmission gear ratio, the actual transmission gear ratio is on the low side lower than the control lowest transmission gear ratio as described above. Accordingly, until time t4 at which the actual variator transmission gear ratio is converged to the control lowest transmission gear ratio, the apparent actual transmission gear ratio is not varied.

At this time, the integration term is accumulated. Accordingly, the variation speed of the target transmission gear ratio is increased (G portion in FIG. 6) so that the actual transmission gear ratio of the variator is followed to the target transmission gear ratio. Then, the accumulation of the integration term is dissolved. When the upshift in the variator is started, the target transmission gear ratio of the variator directs the higher side. Accordingly, the deviation between the actual transmission gear ratio and the target transmission gear ratio of the variator becomes large at the start of the actual shift (H portion in FIG. 6). Accordingly, the variation of the transmission gear ratio by the upshift in the variator from the mechanical lowest transmission gear ratio side becomes sudden operation. As shown in I portion of FIG. 6, when the variator is separated from the mechanical lowest transmission gear ratio side, "Low separation shock" in which the acceleration of the vehicle is instantaneously varied to protrude is generated, so as to provide the unnatural feeling to the driver.

For preventing the "Low separation shock" in the upshift of this variator, it is conceivable that the shift speed of the variator is decreased at the depression downshift so that the actual transmission gear ratio is not overshot beyond the target transmission gear ratio. However, in this case, the target transmission gear ratio is not rapidly attained at the depression cooperative downshift, so that the drivability is decreased.

Moreover, when the depression downshift control is performed in the continuously variable transmission to which the auxiliary transmission is not provided, the sudden variation of the entire transmission according to the shift of the auxiliary transmission mechanism is not generated. The actual transmission gear ratio is not overshot beyond the target transmission gear ratio since the shift speed of the variator is not limited. The sudden variation of the actual transmission gear ratio according to the accumulation of the integration term by the continuation of the overshoot state is not generated.

[Depression Downshift Non-Cooperative Control Operation]

Figure 7:
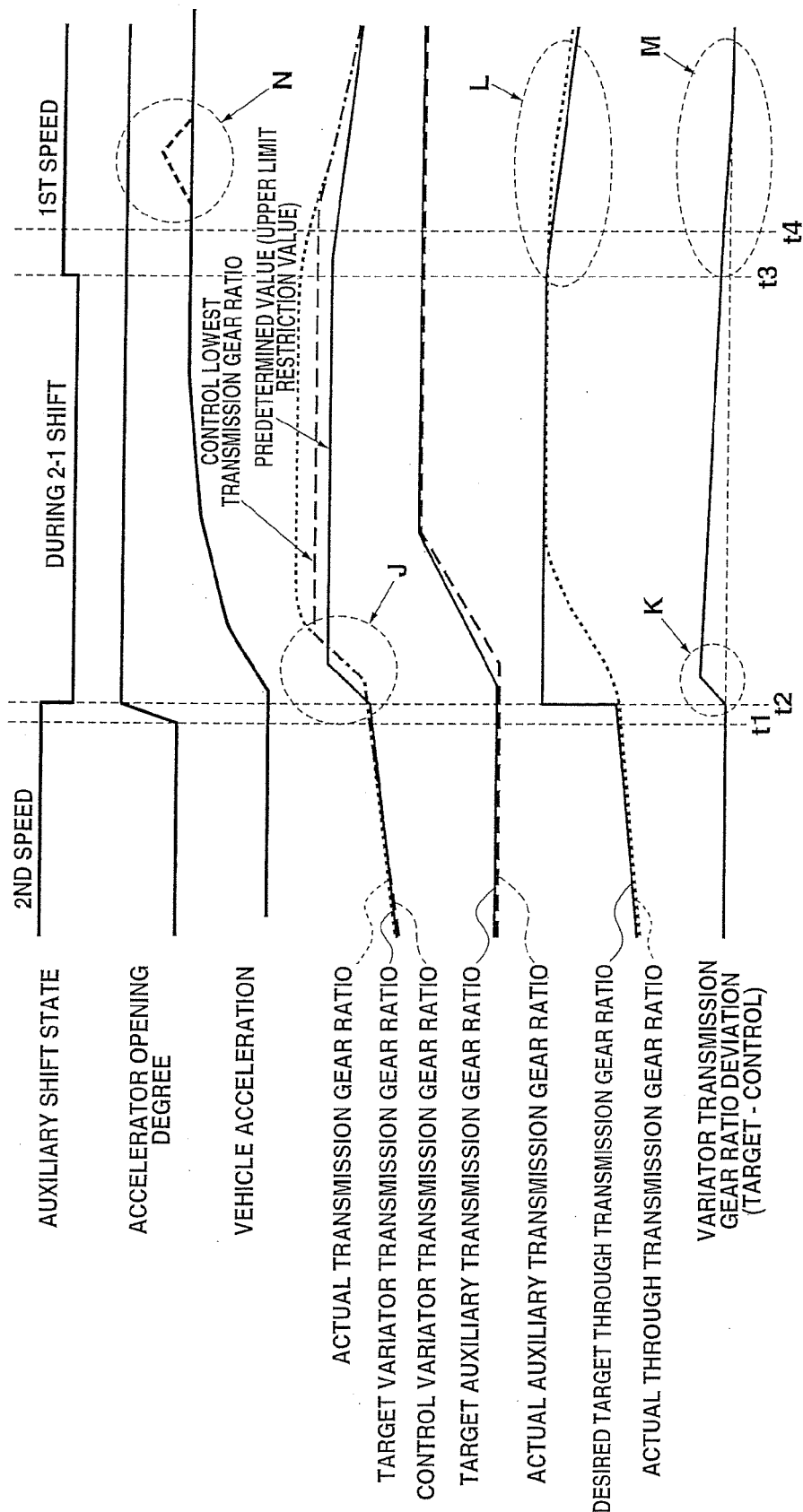
FIG. 7 is a time chart showing characteristics of an auxiliary shift state, an accelerator opening degree, a vehicle acceleration, an actual variator transmission gear ratio, a target variator transmission gear ratio, a control variator transmission gear ratio, a target auxiliary transmission gear ratio, an actual auxiliary transmission gear ratio, a desired target transmission gear ratio, an actual through transmission gear ratio, and a variator transmission gear ratio deviation, which represent a 2→1 depression downshift non-cooperative control that is performed in a transmission controller of the first embodiment.

The depression downshift non-cooperative control operation with the shift of the auxiliary transmission mechanism in the first embodiment is explained based on the flowchart shown in FIG. 5 and the time chart shown in FIG. 7.

In a case where the auxiliary transmission mechanism 2nd speed condition, the depression 2→1 downshift judgment condition, the variator downshift judgment condition, and the Low separation countermeasure region condition are satisfied, the process proceeds along step S1→step S2→step S3→step S4→step S5 in the flowchart of FIG. 5. At this step S5, the variator target transmission gear ratio upper limit value is set to the predetermined value (the upper limit restriction value: the second transmission gear ratio) which is higher than the control lowest transmission gear ratio.

Then, the process proceeds from step S5 along step S6→step S7. While the variator transmission gear ratio deviation>the threshold value is satisfied at step S7, the process repeats the flow of step S6→step S7. At step S, the variator downshift control to set the predetermined value which is higher than the control lowest transmission gear ratio, to the final transmission gear ratio is performed. Then, at step S7, it is judged that the variator transmission gear ratio deviation≤the threshold value is satisfied, the process proceeds from step S7 to step S8. At step S8, the upper limit restriction with respect to the variator target transmission gear ratio is canceled. It is returned to the control lowest transmission gear ratio (the control Low: the first transmission gear ratio). Hereinafter, the depression downshift non-cooperative control operation with the shift of the auxiliary transmission mechanism in the first embodiment is explained based on the time chart shown in FIG. 7.

In the vehicle mounted with the continuously variable transmission with the auxiliary transmission, when the accelerator depression is operated at time t1 from the traveling of the low vehicle speed and low opening degree, the depression downshift with the shift of the auxiliary transmission mechanism is judged at time t2. In a case where the actual transmission gear ratio of the variator 20 is higher than the control lowest transmission gear ratio at this judgment of the depression downshift, the variator 20 is once downshifted from the high side to the lowest side. Moreover, the auxiliary transmission mechanism 30 is downshifted (2nd speed→1st speed) (time t2 to time t3 of FIG. 7). Then, after time t3, the variator 20 is shifted from the lowest side to the high side so as to follow the desired target through transmission gear ratio.

In this way, in a case where the variator 20 is once downshifted to the lowest side, the target transmission gear ratio is set to the predetermined value (the upper limit restriction value) which is higher than the control lowest transmission gear ratio. The shift speed of the variator 20 is increased than that of the normal shift control for attaining the shift response so that the transmission gear ratio of the variator is rapidly varied to the lowest side (J portion of FIG. 7).

In this case, the actual transmission gear ratio (the input rotation/the output rotation) of the variator 20 is shifted and overshot to the side lower than the predetermined value (the upper limit restriction value) set as the target transmission gear ratio (the actual variator transmission gear ratio characteristics shown by a dot line of FIG. 7). In a state where the variator 20 is once downshifted to the lowest side, the actual transmission gear ratio of the variator 20 is overshot beyond the predetermined value (the upper limit restriction value) due to the increase of the shift speed. However, the predetermined value which is the target transmission gear ratio is set to the transmission gear ratio higher than the control lowest transmission gear ratio. Accordingly, it is possible to suppress the overshoot amount to the amount smaller than that of the comparative example of FIG. 6. At this time, the actual transmission gear ratio (the input rotation/the output rotation) is overshot beyond the target transmission gear ratio. However, the actual transmission gear ratio under the calculation is processed as the control lowest transmission gear ratio. Accordingly, in the variator downshift region (K portion of FIG. 7) immediately after time t2 during a time period from time t2 to time t3 of FIG. 7, the variator transmission gear ratio deviation (the target-the control) is largely generated. Then, the variator transmission gear ratio deviation (the target-the control) gradually becomes smaller value with time.

Next, when the target transmission gear ratio of the variator 20 is started to be upshifted from the lowest side to the high side at time t3 so as to follow the desired target transmission gear ratio, the actual variator transmission gear ratio is in a state where the actual variator transmission gear ratio already approaches the control lowest transmission gear ratio. Accordingly, the actual through transmission gear ratio is started to be varied to follow the desired target through transmission gear ratio which is varied from time t3 at the gradual gradient (L portion of FIG. 7). At time t4 at which the target variator transmission gear ratio is converged to the control variator transmission gear ratio (the variator transmission gear ratio≤the threshold value), the target transmission gear ratio is switched from the predetermined value to the control lowest transmission gear ratio.

At this time, the variator transmission gear ratio deviation at time t3 at which the variator 20 is started to be upshifted is small. Moreover, the variator transmission gear ratio deviation after time t3 is gradually converged to zero (M portion of FIG. 7). It is shown that the actual transmission gear ratio by the upshift of the variator 20 from the lowest side is varied. Moreover, the variation of the transmission gear ratio becomes smooth. As shown in an N portion of FIG. 7, when the variator 20 is separated (shifted) from the mechanical lowest transmission gear ratio, it is possible to avoid the generation of "the Low separation shock".

As described above, in the first embodiment, when the downshift judgment to perform the downshift before the upshift of the variator 20 is performed, the target transmission gear ratio when the variator 20 is downshifted to the lowest transmission gear ratio is set to the upper limit restriction value (the second transmission gear ratio) which is higher than the control lowest transmission gear ratio (the first transmission gear ratio).

That is, the control lowest transmission gear ratio is set to a higher side of the mechanical lowest transmission gear ratio which is the upper limit value on the mechanism of the variator 20. In the depression downshift control, the shift speed of the variator 20 which is slower than the auxiliary transmission mechanism 30 is increased with respect to the auxiliary transmission mechanism 30 whose the shift speed becomes faster than that of the cooperative control so that the actual through transmission gear ratio follows the desired target transmission gear ratio. Accordingly, in a case where the downshift of the variator is started by setting the control lowest transmission gear ratio to the target transmission gear ratio like the comparative example, the actual transmission gear ratio is overshot toward the mechanical lowest transmission gear ratio.

On the other hand, in a case where the target transmission gear ratio is previously set to the predetermined value (=the upper limit restriction value) higher than the control lowest transmission gear ratio in consideration of the overshoot amount when the downshift of the variator 20 is started, the deviation between the target transmission gear ratio and the actual transmission gear ratio which determines the controlled variable at the downshift becomes small. Accordingly, it is possible to suppress the overshoot of the actual transmission gear ratio even when the shift speed is increased. Therefore, it is possible to suppress the Low separation shock which is generated in the variator 20 when the variator 20 is separated and upshifted from the mechanical lowest transmission gear ratio side.

Moreover, this embodiment is not a configuration in which "the Low separation shock" is prevented by decreasing the shift speed of the variator 20 at the depression downshift so that the actual transmission gear ratio is not overshot beyond the target transmission gear ratio. In this embodiment, the shift speed of the variator 20 at the depression downshift is increased. Therefore, at the depression cooperative downshift, it is possible to rapidly attain the target transmission gear ratio, and to ensure the improvement of the drivability.

Accordingly, it is possible to suppress the Low separation shock generated at the variator 20 at the depression downshift with the shift of the auxiliary transmission mechanism 30, and to improve the drivability.

In the first embodiment, when the variator downshift is judged, and in the driving region in which it is supposed that the actual transmission gear ratio is overshot toward the mechanical transmission gear ratio with respect to the target transmission gear ratio when the downshift of the variator 20 is performed, the target transmission gear ratio when the variator 20 is downshifted to the lowest transmission gear ratio is set to the predetermined value (=the upper limit restriction value: the second transmission gear ratio) which is higher than the control lowest transmission gear ratio (the first transmission gear ratio).

That is, when the variator downshift judgment condition at step S3 of FIG. 5, and the Low separation countermeasure region condition at step S4 of FIG. 5 are satisfied, the process proceeds to step S5. The variator target transmission gear ratio upper limit value is set to the predetermined value which is higher than the control lowest transmission gear ratio.

Accordingly, only when the Low separation countermeasure region condition by which the Low separation shock is likely to be generated in the variator 20 are satisfied, the variator target transmission gear ratio upper limit value is varied to the predetermined value. Therefore, it is possible to prevent the frequent variation of the variator target transmission gear ratio upper limit value, and to surely suppress the generation of the low separation shock.

In the first embodiment, while the downshift of the variator 20 is performed, the variator transmission gear ratio deviation which is the difference between the target transmission gear ratio of the variator 20, and the control transmission gear ratio processed as the actual transmission gear ratio under the calculation is monitored. When the variator transmission gear ratio deviation becomes equal to or smaller than the threshold value, the upper limit restriction of the target transmission gear ratio is canceled.

That is, when the variator target transmission gear ratio upper limit value is set to the predetermined value at step S5 of FIG. 5, the variator downshift control is performed at step S6 while the variator transmission gear ratio deviation is greater than the threshold value at step S7. Then, it is judged that the variator transmission gear ratio deviation becomes equal to or smaller than the threshold value, and converged, the process proceeds to step S8, The upper limit restriction of the variator target transmission gear ratio upper limit value is cancelled. The variator target transmission gear ratio is returned to the control lowest transmission gear ratio (the first transmission gear ratio).

Accordingly, when the upshift of the variator 20 is actually started after the depression down, the actual transmission gear ratio follows the target transmission gear ratio without the response delay. The Low separation shock is not generated. It is possible to improve the controllability of the transmission, and the drivability.

Next, effects are explained.

The control device of the continuously variable transmission with the auxiliary transmission according to the first embodiment obtains the following effects.

(1) A control device for a continuously variable transmission with an auxiliary transmission which is mounted to a vehicle, and which includes a variator 20 arranged to continuously vary a transmission gear ratio, and an auxiliary transmission mechanism 30 that is disposed in series with the variator 20, and that has a first shift stage being a forward shift stage, and a second shift stage being the forward shift stage, and having a transmission gear ratio smaller than a transmission gear ratio of the first shift stage, the control device including:

a cooperative control means (FIG. 4) configured to perform a cooperative control to shift the auxiliary transmission mechanism 30, and to shift the variator 20 in a direction opposite to a shift direction of the auxiliary transmission mechanism 30 when the shift stage of the auxiliary transmission is varied; and a depression shift control means (FIG. 5) configured to perform a non-cooperative control to shift the auxiliary transmission mechanism 30 at a shift speed faster than a shift speed at the cooperative control when an accelerator pedal is depressed at a degree that is equal to or greater than a predetermined value, and a depression shift control with the shift of the auxiliary transmission mechanism 30 is judged, wherein when an actual transmission gear ratio of the variator at the judgment of the depression shift control is higher than a first transmission gear ratio (control lowest transmission gear ratio) set as an upper limit value for a control of a transmission gear ratio, the depression shift control means (FIG. 5) configured to set a target transmission gear ratio (variator target transmission gear ratio upper limit value) at the shift of the variator to a second transmission gear ratio (predetermined value) which is a restriction value that is higher than the first transmission gear ratio (S5).

Accordingly, it is possible to suppress the Low separation shock generated in the variator 20 at the depression shift control with the shift of the auxiliary transmission mechanism 30, and to improve the drivability.

(2) The depression shift control means (FIG. 5) is configured to set the target transmission gear ratio (the variator target transmission gear ratio upper limit value) at the shift of the variator 20 to the second transmission gear ratio (the control lowest transmission gear ratio) which is the restriction value that is higher than the first transmission gear ratio (S5) when the shift of the variator 20 is judged (Yes at step S3), and the vehicle is in a driving region in which it is supposed that a state in which the actual transmission gear ratio does not correspond to the target transmission gear ratio at the shift of the variator continues during a predetermined time period (overshoot) (Yes step S4).

Accordingly, it is possible to prevent the frequent variation of the target transmission gear ratio (the variator target transmission gear ratio upper limit value) when the variator 20 is shifted to the first transmission gear ratio), and to surely suppress the Low separation shock, in addition to the effects of (1).

(3) The depression shift control means (FIG. 5) is configured to monitor a variator transmission gear ratio deviation between the target transmission gear ratio of the variator 20 and a control transmission gear ratio processed as the actual transmission gear ratio for a calculation when the shift of the variator to set the target transmission gear ratio of the variator 20 to the second transmission gear ratio (the predetermined value) is performed, and to set the target transmission gear ratio (the variator target transmission gear ratio upper limit value) of the variator 20 from the second transmission gear ratio (the predetermined value) to the first transmission gear ratio (the control lowest transmission gear ratio) when the variator transmission gear ratio deviation becomes equal to or smaller than a threshold value (S7→S8 of FIG. 5).

Therefore, in addition to the effects of (1) or (2), the actual transmission gear ratio follows the target transmission gear ratio without the response delay when the upshift is actually started after the depression down. The Low separation shock is not generated. It is possible to improve the controllability of the transmission 4, and the drivability.

Hereinabove, the control device of the continuously variable transmission with the auxiliary transmission according to the present invention is explained based on the first embodiment. However, the concrete configuration is not limited to this first embodiment. Variations and additions of the designs are permitted as long as it is not deviated from the gist of the present invention relating to the claims.

In the first embodiment, in the depression shift control means, the target transmission gear ratio when the variator 20 is downshifted to the lowest transmission gear ratio is the predetermined value (the second transmission gear ratio) which is the restriction value that is higher than the control lowest transmission gear ratio (the first transmission gear ratio), without varying the control lowest transmission gear ratio. However, the depression shift control means may vary the control lowest transmission gear ratio to a higher value, and to perform the upper limit restriction to have the varied control lowest transmission gear ratio as the target transmission gear ratio.

In the first embodiment, the variator 20 has a belt type continuously variable transmission mechanism. However, the variator 20 may be a continuously variable transmission mechanism in which a chain is wound around the pulleys 21 and 22, in place of the V belt 23. Moreover, the variator 20 may be a toroidal continuously variable transmission mechanism in which a power roller arranged to be tilted is disposed between an input disk and an output disk.

In the first embodiment, the auxiliary transmission mechanism 30 is a transmission mechanism having two shift stages of the first speed and the second speed which are the forward shift stages. However, the auxiliary transmission mechanism 30 may be a transmission mechanism having three or more shift stages which are the forward shift stages.

In the first embodiment, the auxiliary transmission mechanism 30 has the Ravigneaux type planetary gear mechanism. However, the auxiliary transmission mechanism 30 may be constituted by combining a normal planetary gear mechanism and frictional engagement elements, or may be constituted by a plurality of power transmitting paths constituted by a plurality of gear trains having different gear ratios, and frictional engagement elements arranged to switch these power transmitting paths.

In the first embodiment, the actuator arranged to displace movable conical plates of the pulleys 21 and 22 of the variator 20 in the axial direction has the hydraulic pressure cylinders 23a and 23b. However, the actuator is not limited to the actuator which is driven by the hydraulic pressure. The actuator of the variator may be an actuator arranged to be electrically driven.

In the first embodiment, the control device for the continuously variable transmission with the auxiliary transmission is applied to the engine vehicle. However, the control device for the continuously variable transmission with the auxiliary transmission according to the present invention is applicable to a hybrid vehicle to which the engine and the motor is mounted as the driving source, and an electric vehicle to which the motor is mounted as the driving source.

The invention claimed is:

1. A control device for a continuously variable transmission with an auxiliary transmission which is mounted to a vehicle, and which includes a variator arranged to continuously vary a transmission gear ratio, and an auxiliary transmission mechanism that is disposed in series with the variator, and that has a first shift stage being a forward shift stage, and a second shift stage being the forward shift stage, and having a transmission gear ratio smaller than a transmission gear ratio of the first shift stage, the control device comprising:

a controller configured to
perform a cooperative control to shift the auxiliary transmission mechanism, and to shift the variator in a direction opposite to a shift direction of the auxiliary transmission mechanism when the shift stage of the auxiliary transmission mechanism is varied; and perform a non-cooperative control to shift the auxiliary transmission mechanism at a shift speed faster than a shift speed at the cooperative control when an accelerator pedal is depressed at a degree that is equal to or greater than a predetermined value, and a depression shift control with the shift of the auxiliary transmission mechanism is judged, wherein when an actual transmission gear ratio of the variator at the judgment of the depression shift control is higher than a first transmission gear ratio set as a lowest value of a control of the transmission gear ratio, the controller is configured to downshift the variator, and to set a target transmission gear ratio at the shift of the variator to a second transmission gear ratio which is a restriction value that is higher than the first transmission gear ratio.

2. The control device for the continuously variable transmission with the auxiliary transmission as claimed in claim 1, wherein the controller is configured to set the target transmission gear ratio at the shift of the variator to the second transmission gear ratio which is the restriction value that is higher than the first transmission gear ratio when the shift of the variator is judged, and the vehicle is in a driving region in which it is supposed that a state in which the actual transmission gear ratio does not correspond to the target transmission gear ratio at the shift of the variator continues during a predetermined time period.

3. The control device for the continuously variable transmission with the auxiliary transmission as claimed in claim 1, wherein the controller is configured to monitor a variator transmission gear ratio deviation between the target transmission gear ratio of the variator and a control transmission gear ratio processed as the actual transmission gear ratio under a calculation when the shift of the variator to set the target transmission gear ratio of the variator to the second transmission gear ratio is performed, and to set the target transmission gear ratio of the variator from the second transmission gear ratio to the first transmission gear ratio when the variator transmission gear ratio deviation becomes equal to or smaller than a threshold value.

* * * * *